G. R. BRINCKERHOFF.
Lawn-Rakes.

No. 157,439. Patented Dec. 8, 1874.

Witnesses:
E. B. Whitmore
H. Kingsbury

Inventor:
Garry R. Brinckerhoff
By Wm. Loughborough
Atty

UNITED STATES PATENT OFFICE.

GARRY R. BRINCKERHOFF, OF NIAGARA, NEW YORK.

IMPROVEMENT IN LAWN-RAKES.

Specification forming part of Letters Patent No. 157,439, dated December 8, 1874; application filed October 20, 1874.

*To all whom it may concern:*

Be it known that I, GARRY R. BRINCKERHOFF, of Niagara, in the county of Niagara and State of New York, have invented a new and useful Improvement in Lawn-Rakes; and I do hereby declare that the following is a full, clear, and exact description thereof, reference being had to the accompanying drawings, making part of this specification, in which—

Figure 1:
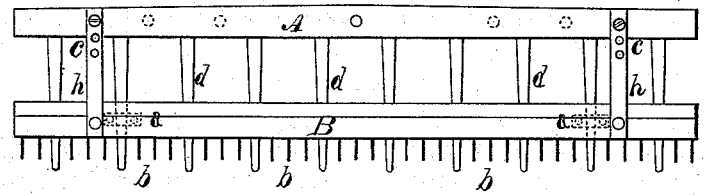
Figure 2:
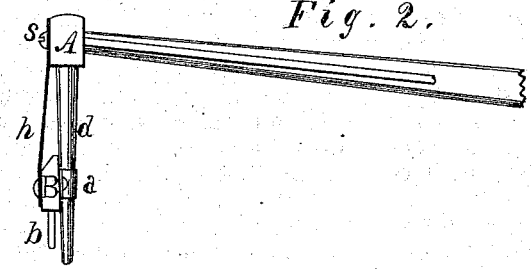
Figure 3:
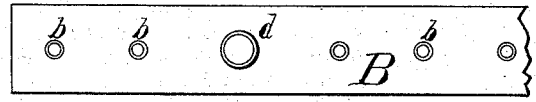

Figure 1 is a rear elevation of the head of an ordinary hand-rake having my invention attached. Fig. 2 is an end view of the same, somewhat enlarged. Fig. 3 shows a modification.

It is well understood that both the ordinary farm and the garden rake are unfit for raking lawns, and the object of my invention is to provide a simple attachment to be applied to the ordinary farm-rake, whereby the latter is especially adapted to raking leaves, &c., from lawns without injuring the grass-roots; and it consists in the employment of a secondary head which carries a quantity of secondary or auxiliary teeth, said head being detachably connected to the ordinary rake-head.

I prefer the ordinary wooden-tooth farm or hand rake to which to apply my invention. The auxiliary head B I make as shown in Figs. 1 and 2. It is provided with two or more loops, $a$, which are arranged as shown in dotted lines in Fig. 1, and clasp around the corresponding teeth. The hanger-straps $h$ may be riveted to the head B, and attached to the head A by screws $s$. These straps $h$ may be provided with several holes, $c$, for the purpose of making the head B adjustable upon the main rake-head A. I prefer to hang the auxiliary head B upon the rear of the teeth $d$ of the primary head, as shown. The head B is provided with any desired number of teeth, $b$, preferably formed of wire, and about three placed in each space between the wooden teeth $d$. By this arrangement of the two sets of teeth, the large ones $d$, preceding, act to loosen up leaves, spears of cut grass, &c., and the finer teeth in the auxiliary head catch and rake them forward without disturbing the grass-roots in the least.

A modification of my invention is shown in Fig. 3, which represents a full-size section of the head B, made thicker and also narrower than that shown in the other figures, and in this case it is provided with holes between the groups of teeth $b$, to receive the large teeth $d$ of the primary head, to which the said auxiliary head is attached, and it may be secured thereto by the adjustable hanger-straps $h$, or by brads or pins driven through a portion or all of the large teeth.

What I claim as my invention is—

1. The combination, with the ordinary hand-rake, of the auxiliary head B, for the purpose set forth.

2. In combination with the primary and secondary or auxiliary heads A and B of rakes, the adjustable hanger-straps $h$, and the loops $a$ or their equivalent, substantially as and for the purposes set forth.

G. R. BRINCKERHOFF.

Witnesses:
 WM. S. LOUGHBOROUGH,
 DANIEL WOOD.